United States Patent [19]

Amberg et al.

[11] Patent Number: 5,410,416
[45] Date of Patent: Apr. 25, 1995

[54] SIMULTANEOUS MULTI-ACCESS, LOW-SPEED/HIGH-SPEED, MULTI-DELIVERY FAX GATEWAY

[75] Inventors: Linadewi S. Amberg, Westminster; Wallace L. Dingee, Jr., Franktown; Mark I. Felton, Aurora, all of Colo.

[73] Assignee: AT&T Corp., Murray Hill, N.J.

[21] Appl. No.: 33,709

[22] Filed: Mar. 16, 1993

[51] Int. Cl.⁶ .............................................. H04N 1/00
[52] U.S. Cl. .................................... 358/405; 358/407; 358/436
[58] Field of Search ............... 358/400, 402, 403, 405, 358/407, 411, 412, 434–436, 442, 444, 431, 437; 379/94, 100; H04N 1/00; 370/94.1, 79, 85.13, 84, 112

[56] References Cited

U.S. PATENT DOCUMENTS

| | | | |
|---|---|---|---|
| Re. 31,182 | 3/1983 | Crager et al. | 178/3 |
| 4,841,375 | 6/1989 | Nakajima et al. | |
| 4,910,610 | 3/1990 | Utsugi | 358/435 |
| 4,941,170 | 7/1990 | Herbst | 358/402 |
| 4,970,603 | 11/1990 | Kanai | 358/400 |
| 4,994,926 | 2/1991 | Gordon et al. | 358/400 |
| 5,010,547 | 2/1991 | Johnson et al. | |
| 5,084,770 | 1/1992 | Nakayama | 358/403 |
| 5,117,453 | 5/1992 | Piasecki et al. | 379/100 |
| 5,163,047 | 11/1992 | Perdikaris et al. | 370/94.1 |
| 5,175,634 | 12/1992 | Matsuzaki | 358/407 |
| 5,189,525 | 2/1993 | Kotani | 358/434 |
| 5,247,591 | 9/1993 | Baran | 358/402 |
| 5,268,846 | 12/1993 | Bonsall et al. | 370/94.1 |

FOREIGN PATENT DOCUMENTS

| | | | |
|---|---|---|---|
| 0360732 | 3/1990 | European Pat. Off. | H04N 1/32 |
| 0480634 | 4/1992 | European Pat. Off. | H04Q 11/04 |
| 0483735 | 5/1992 | European Pat. Off. | H04N 1/32 |
| 63-227172 | 9/1988 | Japan | H04N 1/32 |
| 04079557 | 3/1992 | Japan | H04M 3/00 |
| 05083295 | 8/1993 | Japan | H04L 12/54 |
| 9214334 | 8/1992 | WIPO | H04N 1/00 |

OTHER PUBLICATIONS

Ricoh® Plain Paper Facsimile Product Information Books FAX7000/FAX7000D, pub. 0190.2 RP-1 R0123 (1990) pp. 12-3 to 17-22.
AT&T FAX Attendant System ™ Release 2.1.1: 2nd Draft Switch Notes for System 75/Definity G1 and Definity G3 Commmunications System, (Oct. 1992), pp. 1-1-3-40.
AT&T FAX Attendant System ™ User's Guide, AT&T pub. No. 999-500-418, (Sep. 1991), pp. 1-1--G-3.

*Primary Examiner*—Edward L. Coles, Sr.
*Assistant Examiner*—Kim Yen Vu
*Attorney, Agent, or Firm*—David Volejnicek

[57] ABSTRACT

A fax gateway (10) improves the efficiency of long-distance fax communications by simultaneously receiving a plurality of low-speed (G3) faxes, bundling them into a single fax for transmission to a common distribution, and transmitting the single fax as a high-speed (G4) fax to the destination. At the destination, the high-speed fax is received, unbundled into its constituent faxes, and the constituent faxes are distributed as low-speed (G3) faxes to a plurality of recipients.

33 Claims, 5 Drawing Sheets

SIMULTANEOUS MULTI-ACCESS, LOW-SPEED/HIGH-SPEED, MULTI-DELIVERY FAX GATEWAY

TECHNICAL FIELD

This invention is directed to facsimile telecommunications systems.

BACKGROUND OF THE INVENTION

As facsimile (fax) telecommunications have become ubiquitous in the business world, fax equipment providers have come under pressure from large-volume fax end-users and fax service providers to improve the efficiency of fax telecommunications provided by the equipment, as a means for the equipment users to reduce their costs. The equipment providers have responded with various improvements, including fax servers that provide store-and-forward fax services with receipt-of-fax notification, automatic fax-send retry in case of the destination equipment being busy or indicating failure of reception, automatic broadcasting of a fax to a list of recipients, delayed fax transmission to take advantage of reduced rates during off-peak-use hours, high data-rate transmissions of a plurality of faxes at one time in a continuous batch to a destination fax server, and distribution of the batch of faxes to their final recipients by the destination fax server. One example of such a server is the AT&T FAX Attendant System TM. Another example is disclosed in U.S. Pat. No. 4,994,926. Illustrative batch transmission schemes are disclosed in this patent and in U.S. Pat. No. 5,084,770, and in published European Patent Application publication no. 0 480 634 A2. And examples of high-data-rate transmission schemes may be found in U.S. Pat. No. 4,910,610, U.S. Pat. No. 5,117,453, and U.S. Pat. No. Re. 31,182. Furthermore, the Ricoh FAX7000D is capable of bundling a plurality of sequentially-received Group 3 faxes into a single Group 4 fax for transmission, and printing the constituent faxes of a bundled Group 4 fax.

SUMMARY OF THE INVENTION

We have recognized that continuing inefficiencies in fax telecommunications result from the prior art's persistence in either treating individual faxes as individual faxes for purposes of inter-server transmissions of the faxes, even in the batch and high data-rate transmission modes, or in treating individual faxes as sequential communications for purposes of their collection and distribution. According to our invention, therefore, a plurality of low-speed faxes, such as Group 3 faxes, is simultaneously collected, through one or more channels, and combined into a single fax, and is transmitted as a single high-speed fax, such as a Group 4 fax. The single high-speed fax is received at the receiving end, separated into its constituent individual faxes, and the constituent faxes are distributed as low-speed faxes, such as the original Group 3 faxes, to a plurality of destinations, through one or more channels. This advantageously provides a many-to-one- one-to-many transmission process. A significant time saving and increase in system capacity is achieved through the simultaneous collection of a plurality of the low-speed faxes. This arrangement also has the advantage of efficient use of inter-server transmission facilities on account of the high speed, and consequent short duration, of the transmission. There is a significant reduction in the setup and tear-down period, which are the high-cost periods of the call. This reduces cost, and congestion of the transmission network. In addition, it allows routing or switching nodes of the transmission path to treat the bundle of faxes as a single fax for addressing and routing purposes. This reduces the computational requirements placed on the network's nodes by this transmission. It also yields a benefit to the fax sender, who is charged by the fax carrier for the transfer of only one fax of relatively short duration, as opposed to being charged for the transfer of a plurality of faxes of a much longer cumulative duration. At the receiving end, similar efficiencies as at the transmitting end may be achieved, through simultaneous distribution of the high-speed fax's constituent low-speed faxes to different destinations.

These and other advantages and features of the invention will become apparent from the following descriptive of an illustrative embodiment of the invention taken together with the drawing.

DETAILED DESCRIPTION

Figure 1:
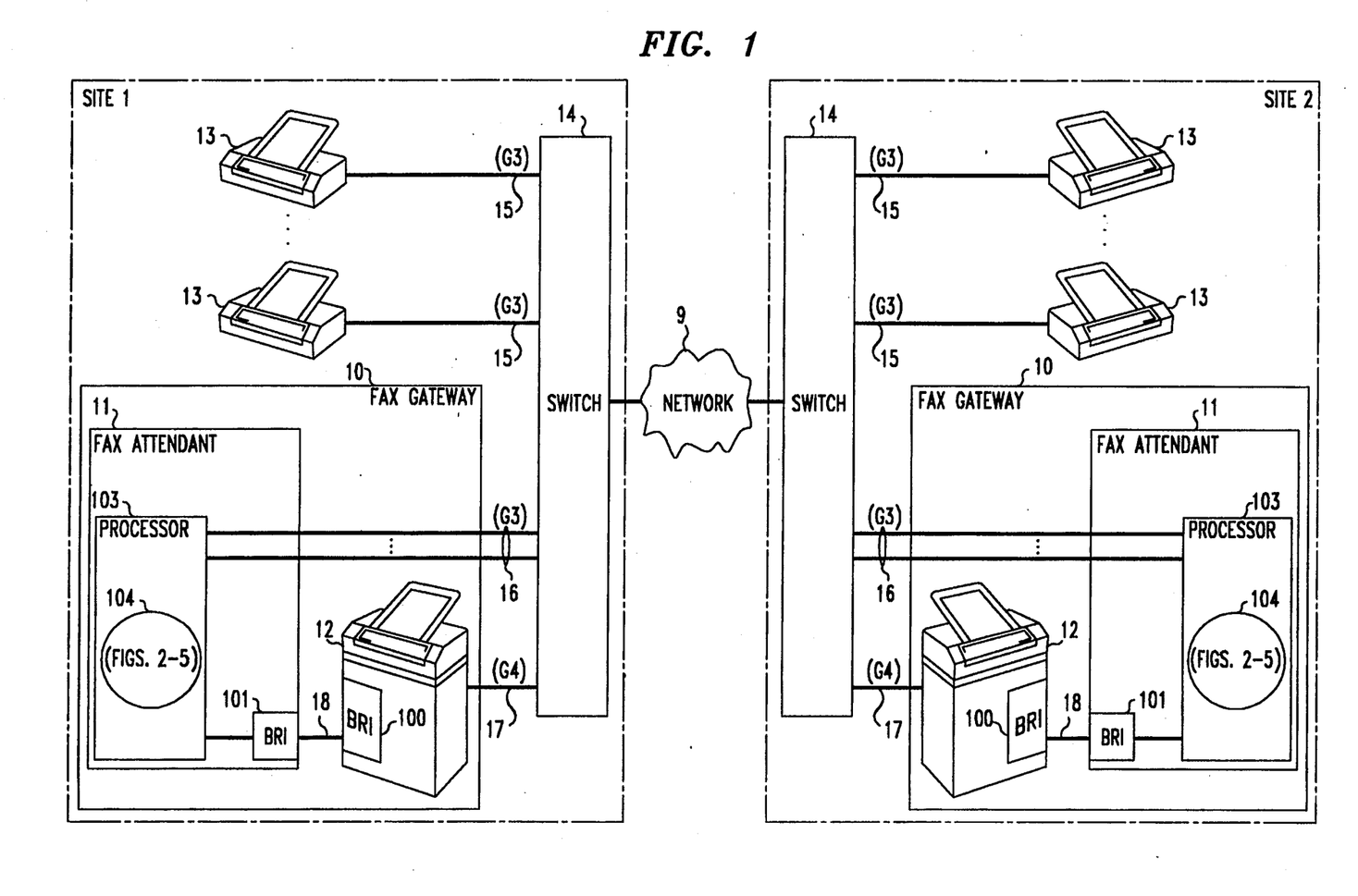
FIG. 1 is a block diagram of a telecommunications system embodying an illustrative example of the invention.

FIG. 1 shows a block diagram of an illustrative fax telecommunications system. The system conventionally comprises fax equipment located at two sites 1 and 2 that are remote from each other, interconnected by a telecommunications network 9. Sites 1 and 2 are, for example, two corporate offices located in different regions, or two countries. Network 9 is, for example, a private or a 5public telephone network. The fax equipment at each one of the sites 1 and 2 is conventionally connected to network 9 by a switch 14 that is a part of network 9 and that serves that particular site. Each switch 14 is, for example, a local telephone central office or a private branch exchange (PBX).

The fax equipment at each site 1 or 2 conventionally comprises a plurality of conventional Group 3 (G3) fax terminals 13 that are connected to switch 14 via telephone lines 15 (or other local facilities) and communicate over telephone lines 15 using the conventional G3 protocol. The G3 fax system is internationally defined by the International Telephone and Telegraph Consultation Committee (CCITT) Red Book recommendations T.4 and T.30. According to the recommendation T.30, the G3 fax signal is an analog signal, and its data rate is a slow 9600 bits per second (bps) or less.

According to the invention, the fax equipment at each site 1 or 2 further comprises a fax gateway 10. Fax gateway 10 is a fax server that provides enhanced services to a plurality of fax terminals 13 of its local site. Taking site 1 as an example, its fax gateway 10 receives through switch 14 the G3 faxes sent by fax terminals 13 of site 1 that are destinated for a remote site such as site 2, bundles a plurality of the received G3 faxes into a Group 4 (G4) fax, and transmits the G4 fax through network 9 to fax gateway 10 of the remote site 2. At site 2, the local fax gateway 10 receives the transmitted G4 fax, unbundles it into its constituent G3 faxes, and sends the G3 faxes through local switch 14 to local fax terminals 13 that are the intended recipients of these faxes. The G4 fax system is internationally defined by the CCITT Red Book recommendations T.5 and T.6, and CCITT Blue Book recommendation T.563. According to the recommendation T.5, the G4 fax signal is a digital signal having a data rate of either 64 kilobits per second (Kbps) or the data rate of the public switched telephone network (generally interpreted as 56 Kbps).

Illustratively, each fax gateway 10 is implemented using a G4 fax terminal 12 and an AT&T FAX Attendant System ™ 11. G4 fax terminal 12 is a conventional commercially-available device, such as Ricoh FAX 7000D. It is connected to switch 14 by an ISDN basic rate interface (BRI) telephone line 17 over which it communicates via G4 signals. FAX Attendant System 11 is a commercially available system that provides FAX store-and-forward messaging services to a plurality of users. It is conventionally connected to switch 14 by a plurality of analog telephone lines 16, over which it communicates, via G3 signals, with a plurality of G3 fax terminals 13.

G4 fax terminal 12 and FAX Attendant System 11 are each equipped with an extra BRI line interface circuit 100 and 101, respectively. Circuits 100 and 101 are connected with each other by an ISDN telephone line 18 over which they communicate via conventional data transfers. The internal controller (not shown) of G4 fax terminal 12 is reprogrammed to redirect its standard input from the conventional document reader (not shown) to circuit 100, and to redirect its standard output from the conventional document printer (not shown) also to circuit 100. Consequently, terminal 12 transmits on line 17 as a G4 fax any data that it receives on line 18, and transmits as data on line 18 any G4 fax that it receives on line 17.

An alternative implementation of fax gateway 10 would be to design the functionality of G4 fax terminal 12 directly into FAX Attendant System 11 and to eliminate the stand-alone terminal 12, whereby system 11 would communicate directly with switch 14 in G4 signal format. This would eliminate the delay incurred in communicating G4 fax data to and from FAX Attendant System 11 over line 18, and would allow G4 fax data to move into and out of storage in system 11 at data rates in excess of the G4 rate so as to achieve maximum data throughput.

In use, the interaction between fax gateway 10 and a user is substantially identical to that between FAX attendant system 11 and a user. Considering first a user on site 1 who wishes to send a fax, he or she establishes contact with fax attendant system 11 of site 1 in the usual manner, using a fax terminal 13. The contact is established, through switch 14 and an analog line 16, with processor 103. Processor 103 receives the call, at step 200 of FIG. 2, and communicates with the user in the usual manner to obtain the usual information, e.g., the user's identification and the telephone numbers of the intended recipients of the fax (destination telephone numbers), at step 202. Processor 103 also obtains, at step 202, the time of transmission of the fax desired by the user. This may simply be the conventional indication of whether immediate or economy transmission of the fax is desired. Processor 103 then checks the destination telephone numbers, at step 204, to determine how to process the fax. Processor 103 includes in its memory a table 170 that contains entries 171 which identify remote sites, such as site 2, that are served by fax gateways 10. Illustratively, each entry 171 of table 170 has a field 172 that contains the country code and area code served by a fax gateway 10, and a field 173 that identifies the serving fax gateway 10. Processor 103 checks the destination telephone numbers to determine if any of them include a country code or an area code, at step 206. Those that do not are considered to be intended for local delivery in site 1, and processor 103 processes the fax for these destinations in the conventional fax attendant system 11 manner, at step 210. If any destination telephone numbers do include a country code or an area code, processor 103 compares these codes against fields 172 of entries 17 1 of table 170, at step 208, looking for a match, which indicates that the destination number is served by a fax gateway 10. For destination telephone numbers that do not have a match in table 170, processor 103 processes the fax in the conventional fax attendant system 11 manner, at step 210.

If any destination telephone numbers do have a match in table 170, fax gateway service is provided for these destinations, and processor 103 retrieves the gateway I.D. from field 173 of the matching entry 171, at step 211. Processor 103 then checks the state of an internal transmit flag 196, at step 212, which indicates whether fax attendant 11 is presently transmitting data to terminal 12. If the flag is set, indicating that transmission is occurring, processor 103 waits until flag 196 becomes cleared. If and when transmit flag 196 is found to be cleared at step 212, processor 103 obtains the fax from the user and stores it in its memory, at step 214, either in a fax directory 161 for a particular gateway, if all destination numbers have the same match in table 170, or in a multi-site fax directory 160, if there is more than one match in table 170 for the destination numbers. Processor 103 then inserts an entry 181 for this fax into a schedule queue 180, at step 216. Queue 180 is a listing in chronological order by desired transmission time of all stored faxes that remain to be transmitted. Each entry 181 has a time field 183 that indicates the desired transmission time, a fax I.D. field 184 that identifies the corresponding fax, such as a pointer into memory to where the fax is stored, and a gateway I.D. field 182 whose contents, obtained at step 211 from table 170, identify the serving fax gateway 10. Entries 181 for all faxes whose desired transmission time is "immediately" are placed at the head of schedule queue 180. Processor 103 then exits the function of FIG. 2, at step 218.

Figure 2:
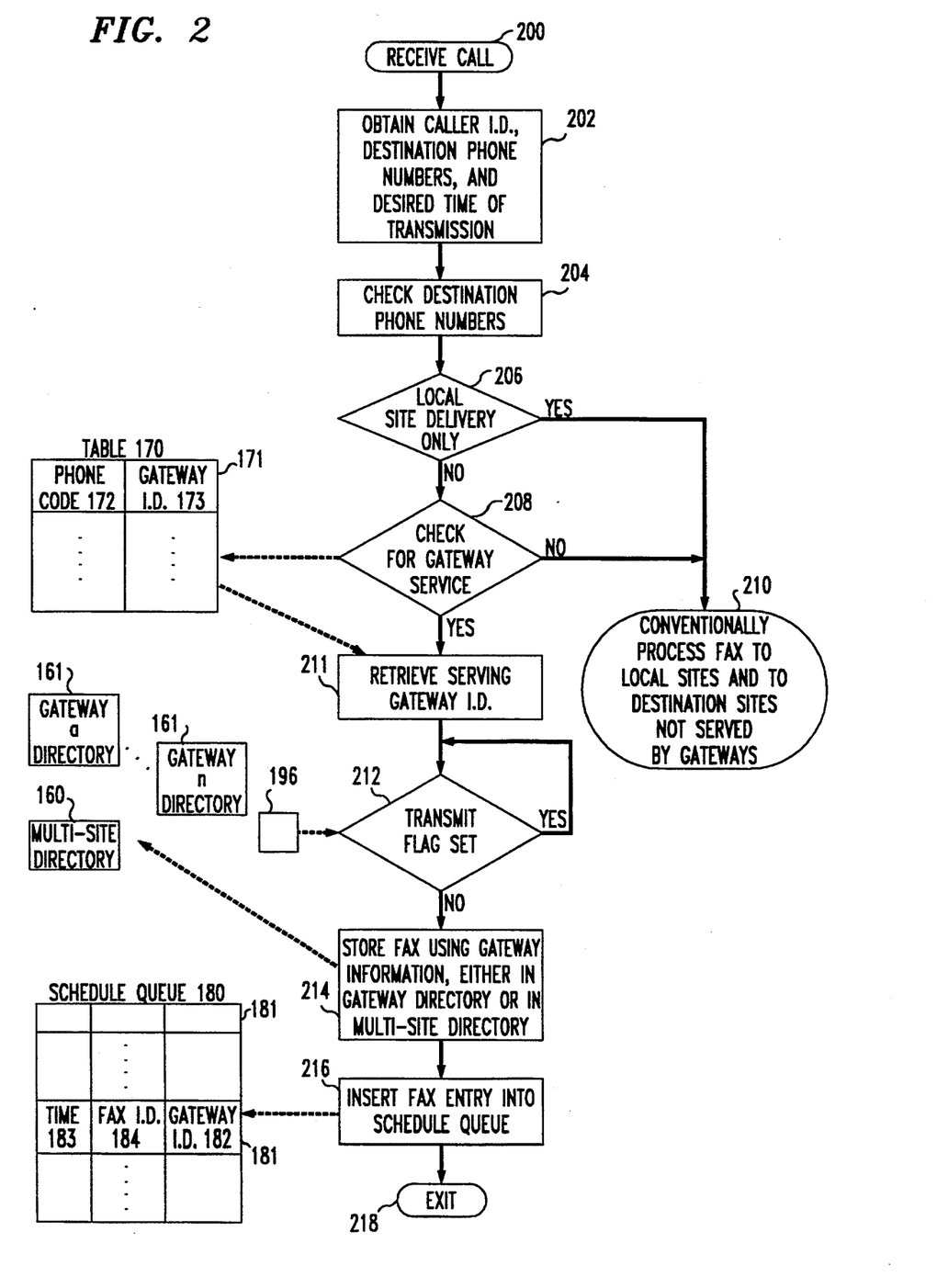
FIGS. 2–4 are flow diagrams of fax transmission functions performed by a fax gateway of the system of FIG. 1.

Significantly, processor 103 may be simultaneously (on a time-shared basis) executing a plurality of the functions illustrated in FIG. 2, wherein each of the functions communicates with a different G3 fax terminal 13.

Figure 3:
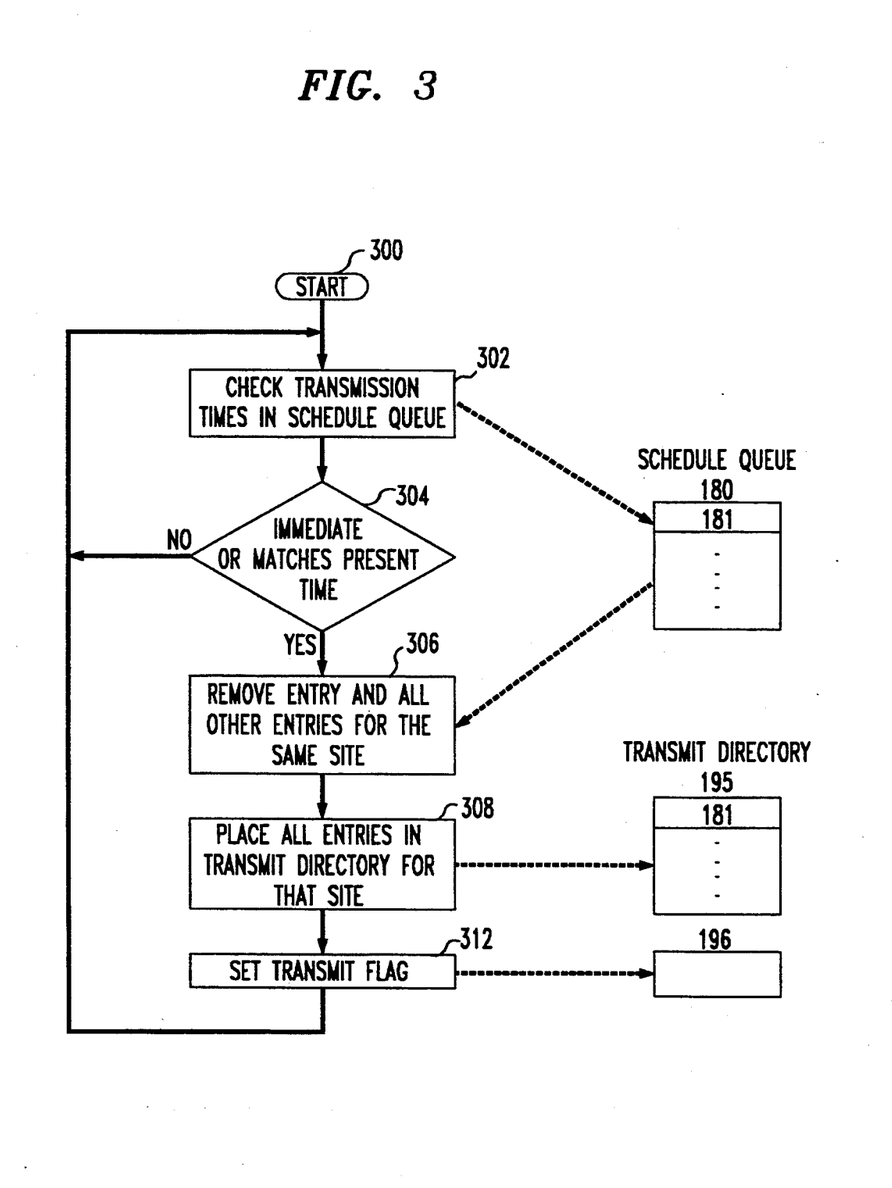

Ever since its initial startup, processor 103 executes the function shown in FIG. 3 substantially continuously (on a time-shared basis with other functions). Upon starting to execute this function, at step 300, processor 103 checks the contents of time field 183 of entries 181 of schedule queue 180, at step 302. If there are no entries 181 whose field 183 contents either match present time or indicate that their desired transmission time is "immediately", as determined at step 304, processor 103 merely returns to step 302 to (eventually) repeat the check. If, however, the contents of field 183 of any entry 181 either match present time or indicate that the desired transmission time of this fax is "immediately", as determined at step 304, processor 103 removes the first such entry 181, and all other entries 181 destined for the same site (i.e., having the same contents in gateway I.D. field 182), from schedule queue 180, at step 306, and places them in a transmit directory 195 for that site, at step 308. Processor 103 then sets the above-mentioned transmit flag 196, at step 312, and returns to step 302. A separate transmit directory 195 is thus created for each different gateway 10 to which a fax is to be sent at this time.

Figure 4:
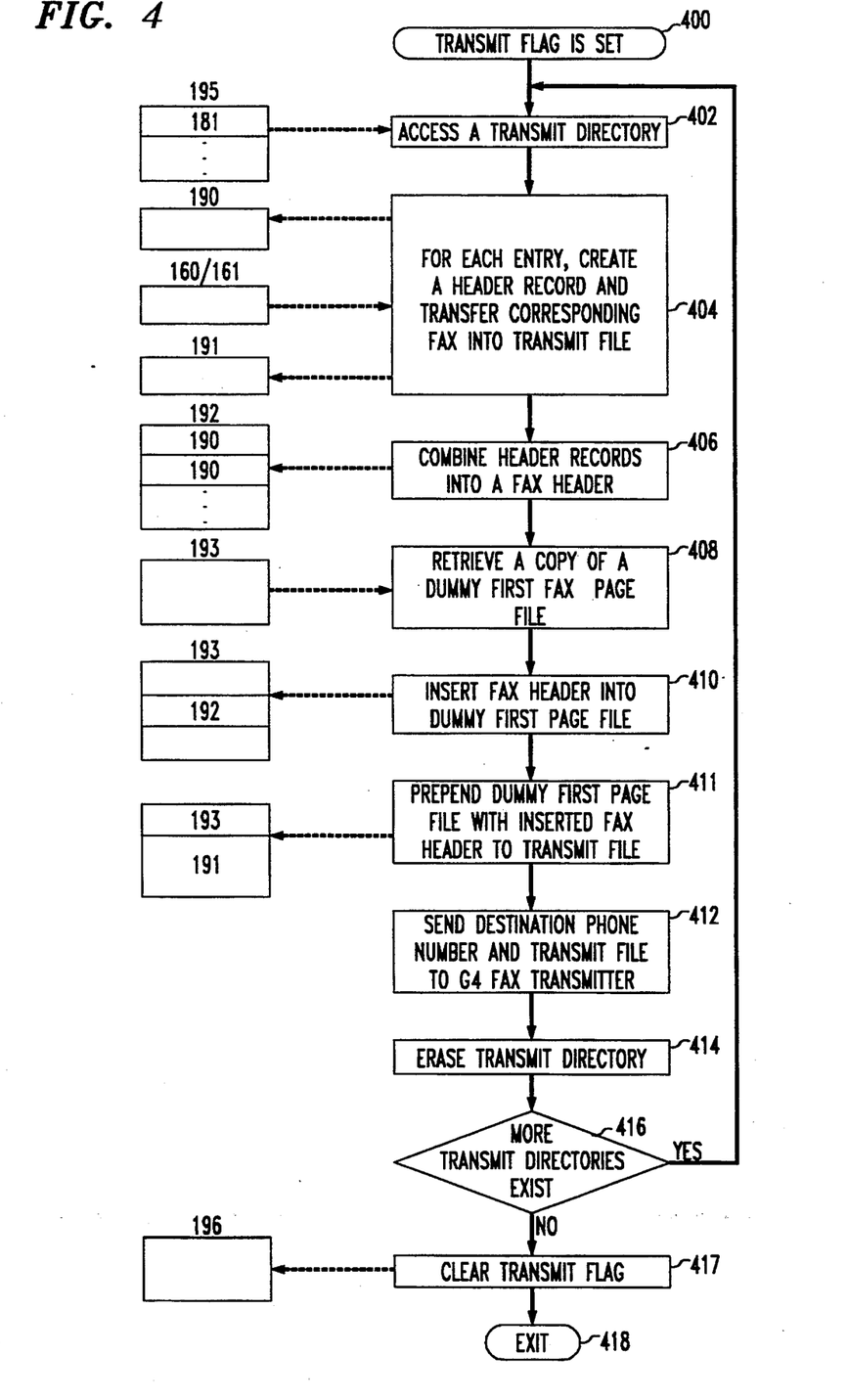

The setting of transmit flag 196 at step 312 invokes the transmitter function, at step 400 of FIG. 4. Upon commencing to execute this function, processor 103 accesses one of the transmit directories 195, at step 402. For each entry 181 of the accessed transmit directory 195, processor 103 creates a header record 190 and transfers the corresponding fax from a fax directory 160 or 161 into a transmit file 191 in its memory, at step 404. A header record 190 carries fax-delivery attributes for the fax. It illustratively comprises a fax number that identifies the corresponding fax in transmit file 191, and one or more operational fields that serve as instructions to the receiving end as to what to do with the corresponding fax. These instructions could be, for example, to store the fax in the mailbox of one or more particular users, to send the fax to one or more particular telephone numbers, or to retransmit the fax to one or more other fax gateways 10. Processor 103 formulates the header on the basis of information that was collected from the fax sender at step 202 of FIG. 2. The end of the record is illustratively marked with an end-of-record flag.

Having created a header record 190 for each fax identified in the accessed transmit directory 195, processor 103 now combines records 190 into a fax header 192, at step 406. Fax header 192 is illustratively merely the collection of header records 190 delineated by a start-of-header flag and and end-of-header flag. Processor 103 has stored in its memory a dummy file 193 that represents an arbitrary first page of a fax, and processor 103 now retrieves a copy of this dummy first page file 193, at step 408. Processor 103 then inserts fax header 192 into this copy of dummy first page file 193, at step 410, by replacing, byte-for-byte, a portion of file 193 (representing a center part of the fax page) with fax header 192. Processor 103 then prepends file 193 that now includes fax header 192 to transmit file 191 that carries the faxes, at step 411, and sends this combined file, along with the telephone number of the destination fax gateway 10, to G4 fax terminal 12, at step 412. The transfer between processor 103 and fax terminal 12 proceeds via BRI line circuit 101 and line 18 as a conventional data transfer. Processor 103 now erases the transmit directory 195 that it accessed at step 402, at step 414, and checks whether other transmit directories 195 exist, at step 416. If so, processor 103 returns to step 402 to process another transmit directory 195; if not, processor 103 clears transmit flag 196 to indicate that it is done transmitting, at step 417, and then exits the transmitter function, at step 418.

G4 fax terminal 12 receives the destination telephone number and the combined file that processor 103 sent at step 412, via BRI line circuit 100. Terminal 12 converts the file into a G4 fax in the conventional manner, and transmits the G4 fax on line 17 for delivery by network 9 to fax gateway 10 of the destination site, such as site 2.

Figure 5:
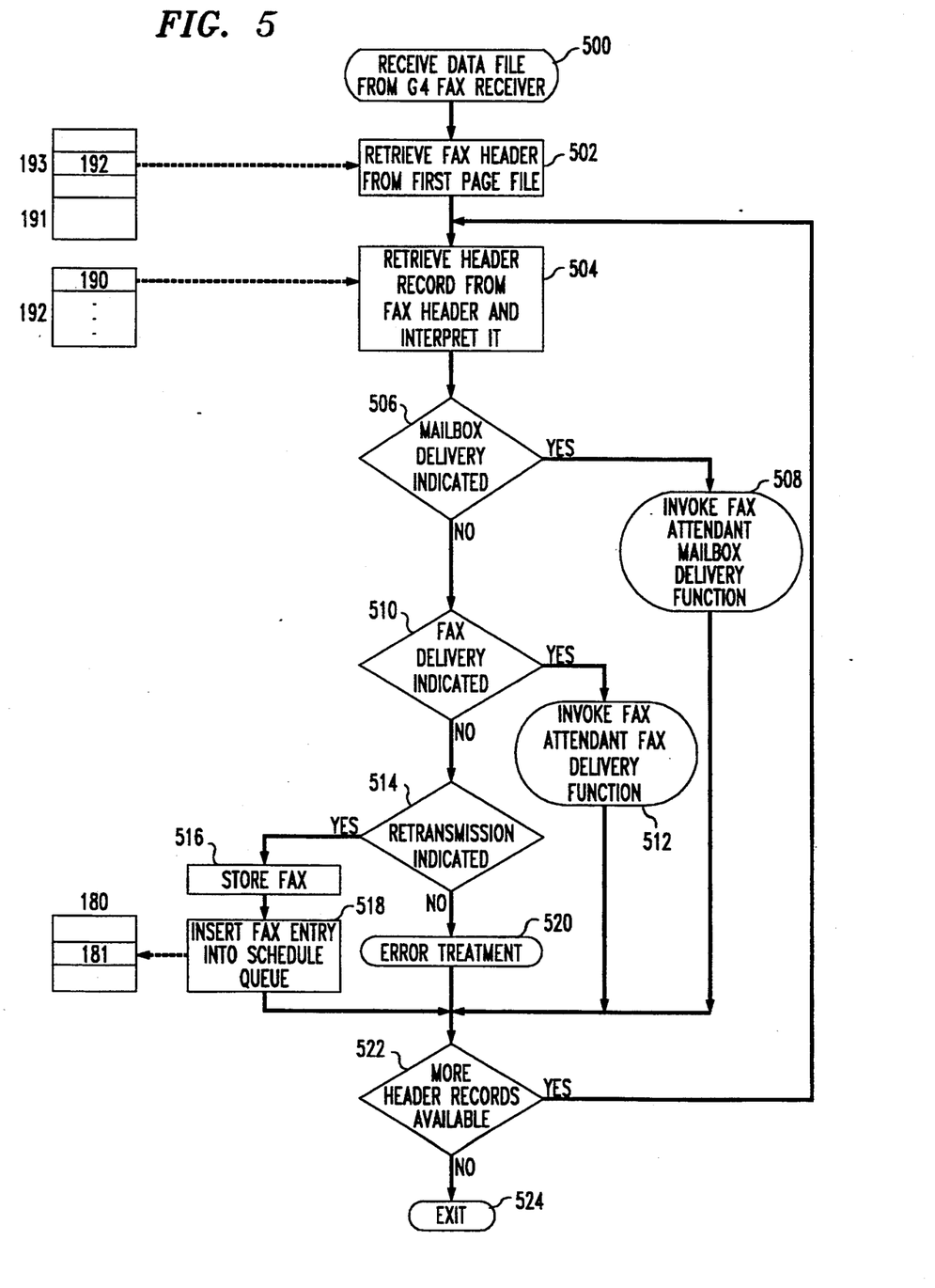
FIG. 5 is a flow diagram of fax reception functions performed by a fax gateway of the system of FIG. 1.

At the destination site, G4 fax terminal 12 receives the G4 fax from network 9, decodes it from the G4 fax format into a conventional data file, and sends the data file via BRI line circuit 100 and line 18 to fax attendant 11. Processor 103 receives this data file, which duplicates the file created at the transmitting site at step 411 of FIG.4, at step 500 of FIG. 5. Processor 103 then retrieves fax header 192 from the dummy first page file 193, at step 502, and retrieves the first header record 190 from fax header 192 and interprets its contents, at step 504, to determine what needs to be done with the corresponding fax. If the retrieved header record 190 indicates that the fax is to be delivered into a mailbox of one or more identified users, as determined at step 506, processor 103 invokes a conventional mailbox fax-delivery function of fax attendant system 11, at step 508, to effect the mailbox delivery. If the retrieved header record 190 indicates that the fax is to be delivered to one or more identified fax telephone numbers, as determined at step 510, processor 103 invokes a conventional fax delivery function of fax attendant system 11, at step 512, to effect delivery of the fax as a conventional G3 fax to fax terminals 13 of the intended recipients. If the retrieved header record 190 indicates that the corresponding fax is to be retransmitted to another fax attendant 10, as determined at step 514, processor 103 stores the fax in its memory, at step 516, and then inserts an entry 181 for this fax into the local schedule queue 180, at step 518. The gateway I.D.s of the destination fax gateways 10 are obtained from the header record 190; in other respects, step 518 duplicates step 216 of FIG. 2. If, for some reason, processor 103 is unable to process the fax based on the information provided by header record 190, it invokes error treatment for the fax, at step 520. Illustratively, this may comprise discarding the fax and notifying the sending fax gateway 10 of the failure to process the fax. Following step 508, 5 12, 518, or 520, processor 103 checks fax header record 192 to see if it contains any more header records 190, at step 522. If so, processor 103 returns to step 504 to retrieve and interpret the next record, and execution of the function of FIG. 5 may proceed simultaneously (on a time-shared basis) with the execution of any functions that were invoked at step 508 or 512. If fax header record 192 does not contain any more header records 190, processor 103 exits the function of FIG. 5, at step 524.

Of course, various changes and modifications to the illustrative embodiment described above will be apparent to those skilled in the art. For example, the intergateway transmission protocol may be expanded to convey the following types of messages in the G4 fax header:

- Exist Messages—These messages tell another site critical information about a site during a first contact transmission.
- Distribution Messages—These messages expand the basic distribution of sent fax messages to include LAN, distributed printers, PC, etc. Primary distribution points the already defined to include: G3 fax, fax mailboxes, or retransmission (G3 or G4)
- Parameter Messages—These messages redefine default parameters for a particular message. These can include: retry interval, retransmission attempts, priority level, etc.
- Facility Information Messages—These messages define capabilities, preferred schedules, or other site information that may assist in the transmissions that will be sent in the future to the site that is sending the message. Examples include: best and worst time to send messages, maintenance periods, unattended intervals, speed capabilities, distribution capabilities, etc.
- Request Messages—These messages request the receiving site to send information in the next transmission to the site. This will normally be a request for a Facility Information Message or for a Billing Message.

Priority Messages—These messages are used to request priority levels on certain fax messages. These priorities could be used to flash a light on executives' or secretaries' voice terminals, to trigger a dialed-up message to someone (i.e., a call would be placed to an extension and then a recording played), or to ensure that a special priority level is placed on a G3 transmission.

Association Messages—These messages are used to associate a mailbox with a secondary extension (e.g., a secretary). The message would be placed in one person's mailbox but would light another person's light.

Security Message—These messages include information about scrambled or otherwise secured messages.

Compression Message—These messages include information on compression used.

Local Script Message—These messages request that a local script be used for message distribution. This can be used to reduce transmission time on distributions done on a regular basis at a remote site. Instead of sending the distribution information each time, the information is held at the remote site under a specified label. The Local Script Message is sent along with the label.

System Message—This message will be sent to the system administrator for the remote site. The system message allows these messages to be sent without knowledge of the mailbox number at the remote site.

Cancel Message—Used to cancel a request that was sent previously.

Hold Message—Used to request that a message that is sent ahead of schedule be held at the final site until a designated time before it is placed in a person's mailbox or otherwise distributed to the final destination.

Reject Messages—Sent to inform the system that a previous attempt failed for some reason. Cause codes are included along with information about the message rejected.

Fax Response Request Message—This message is sent to a remote site to request that a message existing in the system (brochure, etc.) be queued up and sent out to a designated destination at the originating site.

Billing Message—These messages can be sent and requested to allow billing to be generated from a single site.

Usage Message—Used along with billing messages for centralized accounting. The Usage Message includes fax calling information used for recordkeeping purposes.

Alarm Message—These messages can be sent to a remote site if certain defined alarm conditions occur. Alarm conditions can include equipment failures, security concerns, etc.

Continue Message—This message is used to show that a page of header information is continued onto the next page. This may be needed when sending billing information.

Queue Message—This message is included in a request to queue the request up immediately rather than as part of the next normal transmission to the site. The level of queue priority can be included, allowing it to become either a normal scheduled delivery or an immediate delivery.

Such changes and modifications can be made without departing from the spirit and the scope of the invention, and without diminishing its attendant advantages. It is therefore intended that such changes and modifications be covered by the following claims.

We claim:

1. A fax communication method comprising the steps of:
   simultaneously collecting a plurality of slow-speed faxes some of which are destined for different destination sites from others of said plurality of slow-speed faxes;
   combining the plurality of slow-speed faxes that are destined for a common destination site into a single fax;
   creating a common fax header for the plurality of combined faxes;
   attaching the common fax header to the single fax; and
   transmitting the single fax with the attached common fax header as a high-speed fax to the common destination site.

2. The method of claim 1 wherein:
   a slow-speed fax is a G3 fax; and
   the high-speed fax is a G4 fax.

3. The method of claim 1 wherein:
   the step of creating comprises the steps of forming a header record for each slow-speed fax, and
   combining the header records of the plurality of slow-speed faxes into a single fax header; and
   the step of attaching comprises the step of attaching the single fax header to the plurality of slow-speed faxes.

4. The method of claim 3 wherein the step of attaching the single fax header comprises the step of:
   obtaining a dummy first fax-page file;
   replacing a portion of the dummy first fax-page file with the single fax header to form a first fax page file; and
   prepending the first fax page file to the plurality of slow-speed faxes.

5. The method of claim 1 wherein:
   the step of collecting comprises the step of simultaneously receiving a plurality of slow-speed faxes each having an indicated delivery time and destination site;
   the step of combining comprises the steps of combining each plurality of slow-speed faxes having a common destination site into a separate single fax; and
   the step of transmitting comprises the step of transmitting each said separate single fax as a high-speed fax at the delivery time of at least one of its constituent faxes to the common destination site.

6. The method of claim 1 further comprising the steps of receiving a high-speed single fax comprising a plurality of individual faxes from a source,
   separating the received single fax into its constituent individual faxes, and
   distributing the constituent individual faxes as low-speed faxes to a plurality of destinations.

7. A fax communication method comprising the steps of:
   receiving a high-speed single fax with an attached common fax header and comprising a plurality of individual faxes having a plurality of destinations at a common destination site;

separating the received single fax into its constituent individual faxes; and distributing the constituent individual faxes as low-speed faxes to the plurality of destinations according to instructions contained in the common fax header.

8. The method of claim 7 wherein:
the high-speed fax is a G4 fax; and
a low-speed fax is a G3 fax.

9. The method of claim 7 wherein:
the step of separating comprises, for each constituent individual fax, the steps of retrieving a header record corresponding to the constituent individual fax from a single said attached common fax header comprising a plurality of the header records, and determining distribution attributes for the constituent individual fax from the retrieved header record; and the step of distributing comprises, for each constituent individual fax, the step of delivering the constituent individual fax according to the attributes determined from its header record.

10. The method of claim 9 wherein the step of separating further comprises the step of:

retrieving the fax header from a first fax page file included in the single high-speed fax and prepended to the plurality of constituent individual faxes.

11. The method of claim 7 wherein:
the step of distributing comprises the step of determining from the attache common fax header an indication of destination and manner of delivery for each individual fax; and delivering each constituent individual fax to its indicated destination in the indicated manner.

12. The method of claim 7 wherein the step of distributing comprises the step of simultaneously distributing a plurality of the constituent individual faxes as low-speed faxes to their destinations.

13. A fax communication method in a network comprising a fax source site and at least one fax destination site, comprising the steps of:

simultaneously collecting a plurality of slow-speed faxes at the fax source site, each collected fax having at least one destination and some of the collected faxes having destinations different from destinations of others of the collected faxes;

determining at the fax source site whether a destination of a plurality of the collected faxes is a destination site served by an arrangement that separates a high-speed fax into a plurality of low-speed faxes;

in response to determining that a destination of a plurality of the collected faxes is a destination site served by said arrangement, combining the plurality of the collected faxes, having as a destination the destination site served by said an arrangement, into a single fax;

creating a single common fax header for the plurality of the combined faxes;

attaching the single common fax header to the single fax; and transmitting the single fax with the attached single common fax header as a high-speed fax from the source site to the destination site.

14. The method of claim 13 further comprising the step of:

transmitting collected faxes having a destination either at a destination site that is also the source site or at a destination site not served by said arrangement, as individual slow-speed faxes from the source site to their destinations.

15. The method of claim 14 further comprising the steps of:

receiving the high-speed single fax with the attached single common fax header at the destination site;

separating the received single fax into its constituent individual faxes; and distributing the constituent individual faxes as low-speed faxes to their destinations according to instructions contained in the single common fax header.

16. The method of claim 15 wherein:
a slow-speed fax is a G3 fax; and
the high-speed fax is a G4 fax.

17. A fax communication arrangement comprising:

means for simultaneously collecting a plurality of slow-speed faxes some of which are destined for different destination sites from others of said plurality of slow-speed faxes;

processing means for combining the plurality of slow speed faxes that are destined for a common destination site into a single fax;

processing means for creating a common fax header for the plurality of combined faxes;

means for attaching the common fax header to the single fax; and means for transmitting the single fax with the attached common fax header as a high-speed fax to the common destination site.

18. The arrangement of claim 17 wherein:
a slow-speed fax is a G3 fax; and
the high-speed fax is a G4 fax.

19. The arrangement of claim 17 wherein:
the creating means comprise means for forming a header record for each slow-speed fax, and means for combining the header records of the plurality of slow-speed faxes into a single fax header; and the attaching means comprise means for attaching the single fax header to the plurality of slow-speed faxes.

20. The arrangement of claim 19 wherein the means for attaching the single fax header comprise:

means for obtaining a dummy first fax-page file;

means for replacing a portion of the dummy first fax-page file with the single fax header to form a first fax page file; and means for prepending the first fax page file to the plurality of slow-speed faxes.

21. The arrangement of claim 17 wherein:
the collecting means comprise means for simultaneously receiving a plurality of slow-speed faxes each having an indicated delivery time and destination site;

the combining means comprise means for combining each plurality of slow-speed faxes having a common destination site into a separate single fax; and the transmitting means comprise means for transmitting each said separate single fax as a high-speed fax at the delivery time of at least one of its constituent faxes to the common destination site.

22. The arrangement of claim 17 further comprising means for receiving a high-speed single fax comprising a plurality of individual faxes from a source, processing means for separating the received single fax into its constituent individual faxes, and means for distributing the constituent individual faxes a low-speed faxes to a plurality of destinations.

23. A fax communication arrangement comprising:

means for receiving a high-speed single fax with an attached common fax header and comprising a plurality of individual faxes having a plurality of destinations at a common destination site;

processing means for separating the received single fax into its constituent individual faxes; and means for distributing the constituent individual faxes as low-speed faxes to the plurality of destinations according to instructions contained in the common fax header.

24. The arrangement of claim 23 wherein:

the high-speed fax is a G4 fax; and a low-speed fax is a G3 fax.

25. The arrangement of claim 23 wherein:

the separating means comprise means for retrieving, for each constituent individual fax, a header record corresponding to the constituent individual fax from a single said attached common fax header comprising a plurality of the header records, and means for determining, for each constituent individual fax, distribution attributes for the constituent individual fax from the retrieved header record; and the distributing means comprise means for delivering each constituent individual fax according to the attributes determined from its header record.

26. The arrangement of claim 25 wherein the separating means further comprise:

means for retrieving the fax header from a first fax page file included in the single high-speed fax and prepended to the plurality of constituent individual faxes.

27. The arrangement of claim 25 wherein:

the distributing means comprise means for determining from the attached common fax header an indication of destination and manner of delivery for each constituent individual fax; and means for delivering each constituent individual fax to its indicated destination in the indicated manner.

28. The arrangement of claim 23 wherein the means for distributing comprise means for simultaneously distributing a plurality of the constituent individual faxes as slow-speed faxes to their destinations.

29. A fax communication arrangement for a network comprising a fax source site and at least one fax destination site, comprising:

means for simultaneously collecting a plurality of slow-speed faxes at the fax source site, each collected fax having at least one destination and some of the collected faxes ha destinations different from destinations of others of the collected faxes;

means for determining at the fax source site whether a destination of a plurality of the collected faxes is a destination site served by an arrangement that separates a high-speed fax into a plurality of slow-speed faxes;

means responsive to a determination that a destination of a plurality of the collected faxes is a destination site served by said arrangement, for combining the plurality of the collected faxes, having as a destination the destination site served by said arrangement, into a single fax;

means for creating a single common fax header for the plurality of the combined faxes;

means for attaching the single common fax header to the single fax; and means for transmitting the single fax with the attached single common fax header as a high-speed fax from the source site to the destination site.

30. The arrangement of claim 29 wherein the transmitting means further comprise: means for transmitting collected faxes having a destination either at a destination site that is also the source site or at a destination site not served by said arrangement, as individual slow-speed faxes from the source site to their destinations.

31. The arrangement of claim 30 wherein:

a slow-speed fax is a G3 fax; and the high-speed fax is a G4 fax.

32. A fax communication method comprising the steps of:

simultaneously collecting a plurality of slow-speed faxes;

combining the plurality of slow-speed faxes into a single fax;

forming a header record for each slow-speed fax;

combining the header records of the plurality of slow-speed faxes into a single fax header;

obtaining a dummy first fax-page file;

replacing a portion of the dummy first fax-page file with the single fax header to form a first fax page file;

prepending the first fax page file to the plurality of slow-speed faxes; and transmitting the single fax as a high-speed fax.

33. A fax communication arrangement comprising:

means for simultaneously collecting a plurality of slow-speed faxes;

processing means for combining the plurality of slow speed faxes into a single fax;

means for forming a header record for each slow-speed fax;

means for combining the header records of the plurality of slow-speed faxes into a single fax header;

means for obtaining a dummy first fax-page file;

means for replacing a protion of the dummy first fax-page file with the single fax header to form a first fax page file;

means for prepending the first page file to the plurality of slow-speed faxes; and means for transmitting the single fax as a high-speed fax.

* * * * *